Feb. 6, 1940.　　　　　O. W. PINEO　　　　　2,189,270
PHOTOMETER CONSTRUCTION
Filed Sept. 7, 1938
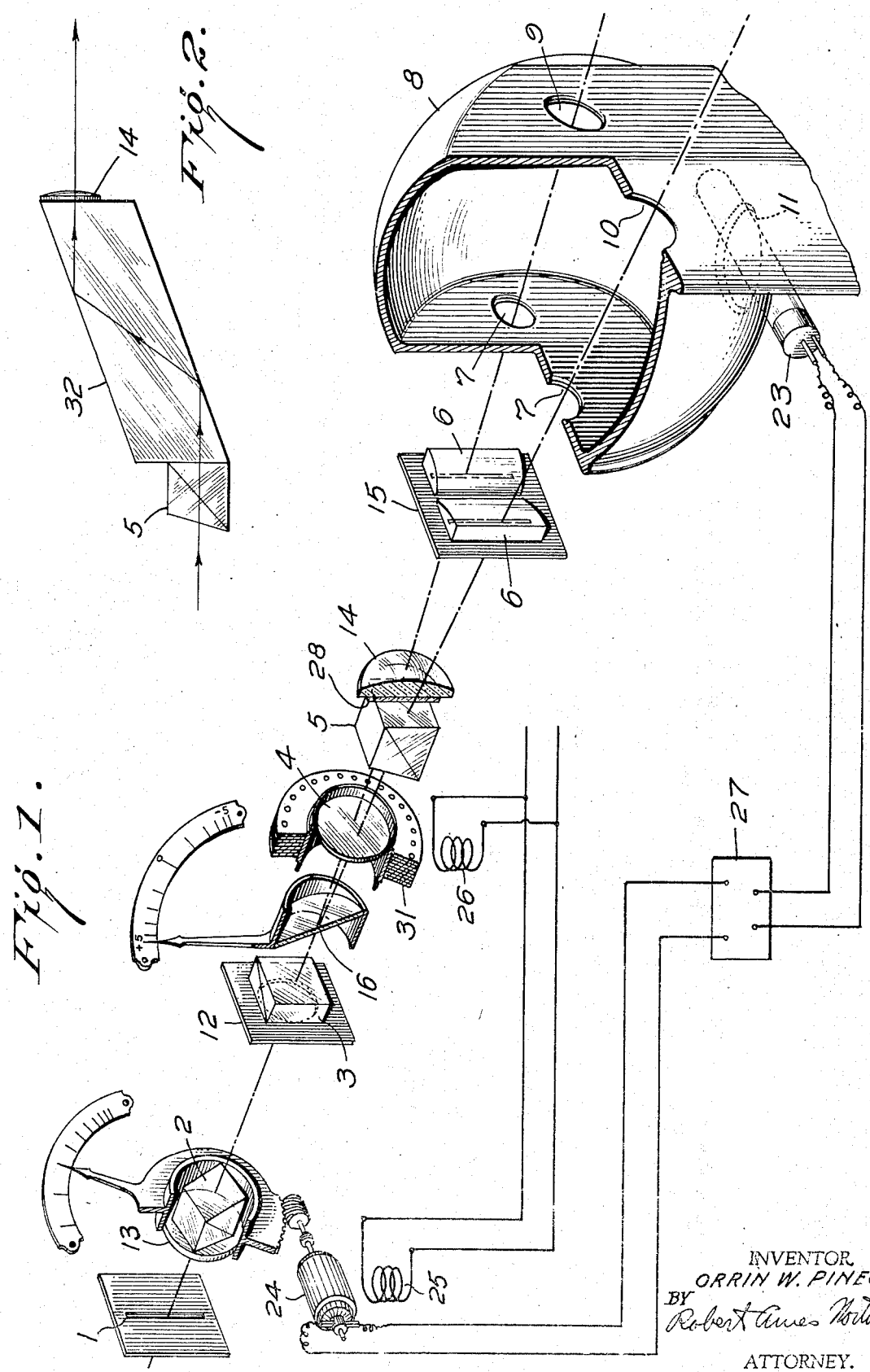
INVENTOR
ORRIN W. PINEO,
BY Robert Ames Norton
ATTORNEY.

Patented Feb. 6, 1940

2,189,270

UNITED STATES PATENT OFFICE 2,189,270

PHOTOMETER CONSTRUCTION

Orrin Weston Pineo, Milo, Maine, assignor, by mesne assignments, to American Cyanamid Company, New York, N. Y., a corporation of Maine Application September 7, 1938, Serial No. 228,737

2 Claims. (Cl. 88—14)

This invention relates to a spectrophotometer of the flickering beam type and more particularly, to improvements in accuracy of such instruments when applied to material showing varying response to incident light plane polarized in different orientations.

Flickering beam spectrophotometers using polarized light such as, for example, those described and claimed in my prior Patent No. 2,107,836 dated February 8, 1938, have achieved widespread commercial use. This type of spectrophotometer, however, does not give as accurate results with materials which shown variations in their reflectance with varying azimuth of incident plane polarized light as with materials which show a substantially uniform reflectance of polarized light in all orientations of the plane of polarization. Improved results are obtained when a flicker type spectrophotometer is used in which the plane of polarization of the incident beams does not vary in orientation. Such spectrophotometers are described and claimed in my prior Patent No. 2,126,410 dated August 9, 1938. However, even in such an instrument where the plane of polarization of the incident light does not vary in its orientation, some difficulty is involved by reason of the fact that when reflectance samples are employed whose reflectance of plane polarized light varies with azimuth, somewhat different results are met if a given sample is changed in its position in the holder. Mathematically, the reflection of polarized light may be expressed by the following equation in which $r$ is the reflectance for non-polarized incident light:

$$r(\psi) = r(1 + \rho \cos 2\psi)$$

$r(\psi)$ is the reflectance as a function of azimuth angle $\psi$, and the "fractional polarization" $\rho$ is a factor which varies, with the nature of the reflecting surface, from zero for non-polarizing samples up to .30 for extreme cases exemplified by plushes and velvets measured at a wave length that is fairly strongly absorbed by the material.

Not only is there a variation due to the orientation of the surface with respect to the beam, but this variation is not constant at all wave lengths so that it cannot be simply detected and compensated for. According to the present invention, the effects of plane polarized incident light are substantially eliminated by transforming the plane polarized light into circularly polarized light or, at least, into elliptically polarized light of very small eccentricity. Circularly polarized light has no unique direction and therefore no reference orientation and therefore completely avoids any dependence on orientation whereas elliptically polarized light gives an orientation effect which is more or less, depending on the eccentricity of the ellipse.

The simplest method of obtaining substantially circularly polarized light is by quarter-wave retardation:

$$\delta = \pi/4$$

This retardation can be produced by the well-known quarter-wave plate, but it varies with the wave length. The variations of $\delta$ are greater with the ordinary quarter-wave plate than with a Fresnel rhomb which produces the same retardation with less variation with wave length.

If we consider the retardation $\delta$ to be introduced at 45° to the plane of the polarized incident beam, the resulting equation is as follows:

$$r(\psi) = r(1 + \rho \cos \delta \cos 2\psi)$$

If $\delta$ is made $\pi/4$ at a given wave length and if it varies 2:1, that is to say, from 120° to 60° through the visible spectrum from blue to red, the reduced polarization $\rho \cos \delta$ is zero at the given wave length, plus $\rho/2$ at the red end of the spectrum, and minus $\rho/2$ at the violet end of the spectrum. With a Fresnel rhomb the same correction takes place, but since the variations of retardation through the spectrum are smaller, the degree of correction remains more constant over the spectrum than with a quarter-wave plate. In fact, for practical purposes, the correction is almost complete.

It is an advantage of the present invention that the compensation for non-uniform reflectance of polarized light by certain substances is obtained without substantially sacrificing other qualities of the spectrophotometer. Thus, for example, when applied to any of the forms shown in Figs. 1, 3 or 4 of my prior Patent No. 2,126,410, all of the advantages of these optical systems are retained and in addition there results complete or substantially complete correction for non-uniform reflectance of certain materials. The present invention is therefore in no sense a compromise but adds a desirable feature to the known spectrophotometers without affecting their advantages.

The invention will be described in detail in conjunction with the drawings in which Fig. 1 is a diagrammatic perspective elevation, partly in section, of a device according to the present invention using a quarter-wave plate; and Fig. 2 is a detail section of a Fresnel rhomb which can replace the quarter-wave plate of Fig. 1.

In the two drawings, like parts are designated with the same reference numerals. 1 is the exit slit of a monochromator (not shown) which may be of any suitable design. The beam therefrom passes through a photometering prism 2 which may be a Nicol prism but is preferably of the achromatic glass Rochon type. This prism is rotatably adjustable about its optical axis to vary the plane of polarization of the light emerging from it for the purpose of varying the relative strengths of the two beams of light falling on the specimen and standard as will now be described.

The light so polarized falls on a Wollaston prism 3 which divides it into two beams polarized at right angles to each other and diverging slightly in direction. The prism 3 is of fixed location and accordingly, the ratio of strengths of the two beams varies in dependence on the plane of polarization of the light incident on it, that is, on the angular setting of the photometer prism 2.

A retardation plate 4, preferably a half-wave plate, is rotated by the synchronous motor 31 at a suitable speed on the optical axis and so produces a retardation of the two beams varying with a phase difference of 90° due to the 90° difference in plane of polarization.

A stationary prism 5 called the flicker polarizing prism and exactly similar to the photometer prism 2 polarizes both beams in the same stationary or fixed plane. On account of the varying retardation of the two beams of light entering the flicker polarizing prism, the beams vary in intensity on emergence from this prism but the effect of the phase difference is to make the intensity variation of the two complementary, so that on correct adjustment of the photometer prism 2 the light of one beam reflected from the specimen and that of the other beam from the standard add up to a constant amount. A quarter-wave plate 28 is cemented to the prism 5. The prism 3, half-wave plate 4, prism 5 and quarter-wave plate 28 are the important elements in the flicker mechanism above referred to.

The beams of light varying in intensity as just mentioned, and circularly polarized at one wave length and elliptically polarized at other wave lengths, are directed respectively onto the sample and standard. The light transmitted or reflected by the sample and standard is collected in a manner appropriate to their nature and the desired conditions of measurement, and is subsequently received by a light-sensitive element. The preferred method for a large class of samples is to average the light transmitted or reflected in the various directions from the sample and standard by means of an integrating sphere 8.

The beams of light just mentioned pass through segmental lenses 6 to increase their relative angle of divergence and enter by openings 7 the hollow integrating sphere 8 coated internally with magnesium oxide. Apertures 9 and 10 are provided on the opposite side of the sphere to the openings 7 for a specimen and standard. Cells may be placed in front of the openings 7 for use in measuring transmission of light through a specimen. A window 11 is provided at a suitable location on the sphere for the accommodation of a photo-cell 23 to detect the flicker. The photo-cell current is amplified by the high gain amplifier 27 and the amplified current used to operate an adjusting motor 24 rotating the photometer prism 2 to such a position that equality of response is given on the photo-cell by light reflected from the specimen behind the opening 9 and the standard behind the opening 10. The motor 24 and the motor rotating the half-wave plate 4 are provided with fields 25 and 26 respectively which are operated from a source of alternating current of constant frequency such as a standard 110 v., A.-C. line.

A definite area of the sample and standard is illuminated by the arrangement described but if it is desired to vary the illuminated area alternative lenses or combination of lenses may be fitted in place of the segmental lenses 6, or elsewhere in the system, to illuminate a smaller or larger area.

Further optical elements are shown in the drawing and these will now be described. A round aperture stop 12 is located immediately in front of the Wollaston prism 3, to limit the aperture of the system. The photometer prism has a lens 13 cemented to its front face and set to focus the dispersing prism of the monochromator onto the aperture stop 12. This lens has a slight cylindrical power to compensate partially the astigmatic imagery of the photometer prism 2, a similar lens 14 is cemented to the rear surface of the flicker prism 5 and serves in conjunction with the segmental lenses 6 to focus the aperture stop 12 onto the specimen behind the opening 9 and standard behind the opening 10. The lens 14 also focuses the exit slit 1 onto a slit image stop 15, which has two rectangular apertures each just large enough to pass an image of the exit slit 1. The function of the stop 15 is to intercept the beams and polarizations discarded by the glass Rochon polarizing element and not otherwise disposed of.

It may occur in checking the instrument with two standard surfaces, for instance of magnesium carbonate, that there is an apparent inequality between the two surfaces due to slight differences in the action of the optical elements on the two beams. An adjusting plate 16 is provided between the Wollaston prism 3 and the half-wave plate 4 to adjust the relative strengths of the two beams to compensate for such inequality. This plate is merely an optical flat, mounted in a rotatable sleeve at an oblique angle so as to change, due to the well-known effect of polarization in transmission through an oblique plate, the relative intensities of the two beams by any amount up to say 5% by appropriate setting.

It will be seen that all movable parts in the optical system, except the half-wave plate 4, are movable only by way of adjustment; that is, they are practically stationary for any one reading or point on the curve. The half-wave plate 4 is the only optical element moved for the purpose of flicker, and since its total effect on the beams of light apart from the change of phase is exceedingly small, it cannot produce any disturbances in the operation of the instrument such as would be introduced by a rotating glass Rochon prism due to its astigmatism and asymmetrical absorption.

Fig. 2 shows a detail view of a Fresnel rhomb 32 which replaces the quarter-wave plate 28. The prism 5 and lens 14 bear the same reference numerals as in Fig. 1. The operation of this modification is the same as that in Fig. 1 but since the variations from circular polarization with changes in wave length are less than with a quarter-wave plate, the device gives more accurate readings over a whole spectrum than does the device of Fig. 1.

What I claim is:

1. A photometer having a flicker mechanism including in optical alignment the following elements in the order named, a source of light, an adjustable polarizing photometering element, polarizing means capable of producing two divergent beams polarized at right angles to each other, means for rotating the planes of polarization of the beams at predetermined frequency in opposite phases, a fixed polarizing element through which the rotating polarized beams pass before encountering the materials to be measured, means located between the fixed polarizing element and the materials to be measured for transforming the beams of plane polarized light into beams which are circularly polarized for one wave length in the spectrum and elliptically polarized with varying degrees of eccentricity for the other wave lengths in the visible spectrum, the adjustment of the photometering element varying the relative intensities of the two polarized beams.

2. A photometer according to claim 1 in which the beams after passing through the fixed polarizing element and circular polarizing means are caused to fall on an optical integrating means having mounts for a specimen and a standard and means for causing the beams to fall respectively on the said specimen and standard whereby light reflected from or transmitted by the specimen and standard is integrated, a photo-electric device receiving the integrated light from said integrating means, means for amplifying the electric current produced by said photo-electric means and rotating means for adjusting the photometering element actuated by the said amplified current.

ORRIN WESTON PINEO.